(12) United States Patent
Edge et al.

(10) Patent No.: US 8,811,939 B2
(45) Date of Patent: Aug. 19, 2014

(54) METHOD AND/OR APPARATUS FOR LOCATION PRIVACY VIA UNIFORM RESOURCE IDENTIFIER PROVISIONING

(75) Inventors: Stephen William Edge, Escondido, CA (US); Andreas Klaus Wachter, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/366,307

(22) Filed: Feb. 4, 2012

(65) Prior Publication Data

US 2012/0202447 A1 Aug. 9, 2012

Related U.S. Application Data

(60) Provisional application No. 61/440,263, filed on Feb. 7, 2011, provisional application No. 61/451,061, filed on Mar. 9, 2011, provisional application No. 61/527,794, filed on Aug. 26, 2011.

(51) Int. Cl.
*H04M 11/04* (2006.01)

(52) U.S. Cl.
USPC ..................................... 455/404.2; 455/456.6

(58) Field of Classification Search
USPC .......................................... 455/404.2, 456.6
See application file for complete search history.

(56) References Cited

U.S. PATENT DOCUMENTS

| | | | |
|---|---|---|---|
| 2004/0224702 A1* | 11/2004 | Chaskar | 455/456.3 |
| 2006/0223490 A1 | 10/2006 | Kim et al. | |
| 2010/0248740 A1 | 9/2010 | Justusson et al. | |
| 2010/0311439 A1 | 12/2010 | Thomson et al. | |
| 2010/0316006 A1 | 12/2010 | Thomson et al. | |
| 2011/0004672 A1 | 1/2011 | Garcia-Martin et al. | |
| 2011/0096769 A1 | 4/2011 | Sim | |
| 2011/0173674 A1* | 7/2011 | Thomson et al. | 726/1 |

FOREIGN PATENT DOCUMENTS

WO WO2010091716 A1 8/2010

OTHER PUBLICATIONS

Khiem A.T., "Location URI Support ", Dec. 15, 2010, pp. 1-18, XP55026694, Retrieved from the Internet: URL:http://member.openmobilealliance.org/ftp/Public documents/LOC/2010/OMA-LOC-2010-0313-CR—LPPe_1_0_TS_Location_URI_Support.zip [ retrieved on May 9, 2012].
OMA DRM Content Format, Approved Version 1.0, Jun. 15, 2004, Open Mobile Alliance OMA-Download-DRMCF-V1_0-20040615-A.
OMA, "Enabler Release Definition for Location in SIP/IP core," Candidate Version 1.0, Nov. 25, 2010, Open Mobile Alliance, OMA-ERELD-LOCISP-V1_0-20101125-C, pp. 1-13.

(Continued)

*Primary Examiner* — Charles Shedrick
(74) *Attorney, Agent, or Firm* — Berkeley Law & Technology Group, LLP

(57) ABSTRACT

The subject matter disclosed herein relates in one particular implementation to a method, apparatus, and/or system for transmitting, by a location server, a location identifier to a mobile device. The location identifier may be transmitted from the mobile device to one or more trusted entities. Access to a location estimate of the mobile device may be selectively authorized at least partially in response to a request received at the mobile device from the location server including the location identifier.

42 Claims, 9 Drawing Sheets

(56) References Cited

OTHER PUBLICATIONS

OMA Enabler Release Definition for OMA Device Management, Approved Version 1.2.1, Jun. 17, 2008, Open Mobile Alliance, OMA-ERELD-DM-V1_2_1-20080617-A.

OMA, "Provisioning Smartcard," Candidate Version 1.1, Apr. 28, 2004, Open Mobile Alliance, OMA-WAP-ProvSC-V1_1-20040428-C, pp. 1-37.

OMA "Push Access Protocol," Candidate Version 2.2—Oct. 2, 2007, Open Mobile Alliance, OMA-WAP-TS-PAP-V2_2-20071002-C, pp. 1-49.

OMA "Push Over the Air," Candidate Version 2.2, Oct. 2, 2007, Open Mobile Alliance, OMA-TS-PushOTA-V2_2-20071002-C, pp. 1-53.

OMA, "UserPlane Location Protocol," Candidate Version 2.0, May 27, 2011, Open Mobile Alliance, OMA-TS-ULP-V2_0-20110527-C, pp. 1-410.

Partial International Search Report—PCT/US2012/024006—ISA/EPO—May 23, 2012.

User Plane Location Protocol, Draft Version 3.0—Nov. 22, 2010, pp. 1-185, XP55026734, Retrieved from the Internet: URL: http://member.openmobilealliance.org/ftp/Public documents/LOC/Permanent-documents/OMA-TS-ULP-V3 0-20101122-D. zip [ retrieved on May 9, 2012].

WAP "Push Message," Version—Mar. 22, 2001, Wireless Application Protocol, WAP-251-PushMessage-20010322-a, pp. 1-14.

WAP Certificate and CRL Profiles, WAP-211-WAPCert, Approved May 22, 2001, Wireless Application Protocol, WAP Certificate and CRL Profiles Specification, 32 pages.

WAP, "Provisioning Content," Version Jul. 24, 2001, Wireless Application Protocol, WAP-183-ProvCont-20010724-a, pp. 1-59.

International Search Report and Written Opinion—PCT/US2012/024006—ISA/EPO—Aug. 6, 2012.

* cited by examiner

METHOD AND/OR APPARATUS FOR LOCATION PRIVACY VIA UNIFORM RESOURCE IDENTIFIER PROVISIONING

CROSS-REFERENCES TO RELATED APPLICATIONS

This application claims priority to provisional patent application Ser. No. 61/440,263, entitled "Location URI Provision by SUPL," which was filed on Feb. 7, 2011; 61/451,061, entitled "Method and Apparatus for Location URI Provision by SUPL", which was filed on Mar. 9, 2011; and 61/527,794, entitled "Location URI Provision by SUPL," which was filed on Aug. 26, 2011.

BACKGROUND

1. Field

The subject matter disclosed herein relates to a method, apparatus, and/or system for supporting location privacy via provisioning of a location Uniform Resource Identifier (URI).

2. Information

The Secure User Plane Location (SUPL) specifications produced by the Open Mobile Alliance (OMA) enable a client application, e.g., a SUPL Agent, to obtain a geographic location of a wireless terminal, e.g., a SUPL Enabled Terminal (SET). SUPL specifications also enable a SET to obtain its own location and the locations of other SETs and to transfer its location to a selected SUPL Agent.

An external client may comprise a SUPL Agent. A SUPL Agent may indirectly acquire a location of a SET from the SET. For example, to acquire a geographic location of a SET, a SUPL Agent may transmit a message to a SUPL Location Platform (SLP) requesting the geographic location. After receiving a message from a SUPL Agent, an SLP may initiate a SUPL session with a SET to acquire a geographic location from the SET, which may subsequently be transmitted from the SLP to the SUPL Agent. There may be a plurality of different SUPL Agents capable of communicating with an SLP to request a location of a SET. However, privacy concerns may be an issue if a geographic location of a SET is transmitted to certain SUPL Agents. For example, privacy concerns may arise if a geographic location of a SET is transmitted to a telemarketing company or to a prospective criminal.

SUMMARY

In one particular implementation, a method implemented at a mobile station, for locating the mobile station, is provided. A location identifier may be received from a location server. The location identifier may be transmitted to one or more trusted entities. A request for a location estimate of the mobile station may be received from the location server. The request may comprise the location identifier received from the location server. The request for the location estimate may be selectively authorized based at least in part on the location identifier.

In one particular implementation, a mobile station is provided. A transmitter may be provided that is capable of transmitting messages to one or more trusted entities, the messages comprising a location identifier for the mobile station received from a location server. A receiver may be provided that is capable of receiving messages comprising a request for a location estimate of the mobile station transmitted from the location server, where the request comprises the location identifier. A processor may selectively authorize the request for the location estimate based at least in part on the location identifier.

In one particular implementation, a mobile station is provided. The mobile station may comprise (a) means for receiving a location identifier from a location server; (b) means for transmitting the location identifier to one or more trusted entities; (c) means for receiving a request for a location estimate of the mobile station transmitted from the location server, the request comprising the location identifier received from the location server; and (d) means for selectively authorizing the request for the location estimate based at least in part on the location identifier.

In one particular implementation, an article is provided that comprises a non-transitory storage medium having machine-readable instructions stored thereon which are executable by a special purpose computing apparatus to: (a) process a received location identifier provisioned at a location server; (b) initiate transmission of the location identifier to one or more trusted entities; and (c) process a received request for a location estimate of a mobile station, the request comprising the location identifier received from the location server; and (d) selectively authorize the request for the location estimate based at least in part on the location identifier.

In one particular implementation, a method is provided that may be implemented at a location server. A location identifier for a mobile station may be transmitted from the location server to the mobile station. A message comprising the location identifier and requesting a location of the mobile station may be received from an external entity. The message may comprise the location identifier. The request for the location estimate may be selectively authorized based at least in part on the location identifier.

In one particular implementation, a location server is provided. A transmitter may be provided that is capable of transmitting one or more messages comprising a location identifier for a mobile station to the mobile station. A receiver may be provided that is capable of receiving one or more messages comprising a request for a location estimate of the mobile station from an external entity, where the request comprises the location identifier. A computing platform may be provided that is capable of selectively authorizing the request for the location estimate based at least in part on the location identifier.

In one particular implementation, a location server is provided. The location server may comprise (a) means for transmitting one or more messages comprising a location identifier for a mobile station to the mobile station; (b) means for receiving one or more messages comprising a request for a location estimate of the mobile station from an external entity, the request comprising the location identifier; and (c) means for selectively authorizing the request for the location estimate based at least in part on the location identifier.

In one particular implementation, an article is provided that comprises a non-transitory storage medium having machine-readable instructions stored thereon which are executable by a special purpose computing apparatus to: (a) initiate transmission of a location identifier for a mobile station from a location server to the mobile station; (b) process a received request for a location estimate of the mobile station from an external entity, the request comprising the location identifier; and (c) selectively authorize the request for the location estimate based at least in part on the location identifier.

DETAILED DESCRIPTION

Figure 1:
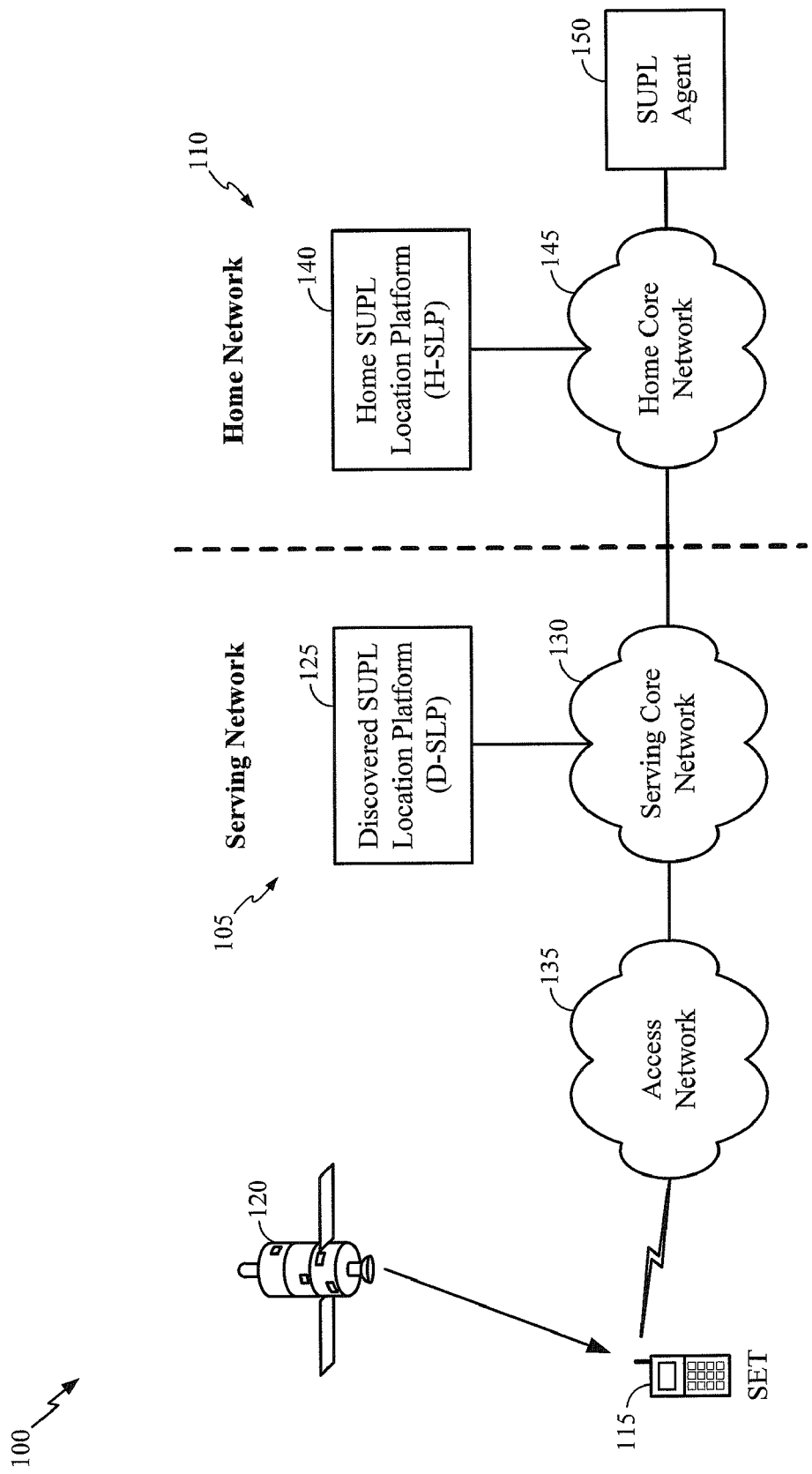
FIG. 1 is a diagram of a communication system supporting an exchange of SUPL messages according to one implementation.

Mobile devices, such as mobile phones, notebook, computers, etc., may have an ability to estimate location and/or position with a relatively high degree of precision using any one of several technologies such as, for example, satellite positioning systems (e.g., GPS, Galileo, Glonass and the like), or advanced forward trilateration (AFLT), just to name a few examples. Location or position estimation techniques may include processing of measurements which are based at least in part on signals acquired at or by a receiver of a mobile device. For example, a mobile device may acquire satellite positioning system (SPS) signals or pilot signals transmitted from a terrestrial base station. Various measured characteristics of acquired signals such as phase, signal strength, time of arrival and/or round trip delay may be utilized to compute a position or location fix of a mobile device.

A "location" as referred to herein may refer to information associated with a whereabouts of an object or thing according to a point of reference. Location may also be referred to as a location estimate, position or position estimate—these terms being used synonymously herein. Here, for example, a location may be represented as geographic coordinates such as latitude and longitude. Alternatively, such a location may be represented as a street address, municipality or other governmental jurisdiction, postal zip code and/or the like. However, these are merely examples of how a location may be represented according to particular embodiments and claimed subject matter is not limited in these respects. A SUPL Enabled Terminal (SET) may estimate its location based at least in part on navigation signals from a Satellite Positioning System (SPS), such as GPS, Galileo or Glonass by, for example, correlating pseudorange measurements from several (e.g., four or more) satellite transmitters. Alternatively, such a location may be estimated from a hybrid system in which a position of a cell based transceiver is determined from a combination of at least: i) a time measurement that represents a time of travel of a message in the cell based communication signals between the cell based transceiver and a communication system; and, ii) a time measurement that represents a time of travel of an SPS signal.

In a particular implementation, User Plane (UP) positioning such as SUPL (Secure User Plane Location) as set forth by the Open Mobile Alliance (OMA) in publicly available documents (e.g., in specification OMA-TS-ULP-V2_0 for SUPL version 2.0 and OMA-TS-ULP-V3_0 for SUPL version 3.0) may provide a framework within which position estimates obtained at a mobile device or at a separate location server (e.g., a SUPL Location Platform (SLP)) may be made available to other entities. Making position estimates available to other entities may be useful in particular applications such as, for example, providing emergency services or locating a user on behalf of another client user. However, particular security and privacy policies may suggest controlling dissemination of location estimates and limiting access of same to particular parties.

Location services based on the location of mobile devices are becoming increasingly widespread. In one implementation, Secure User Plane Location (SUPL) may employ techniques to transfer location information and/or position information. SUPL may be utilized to transfer location information that may be used to compute a target SET's location.

SUPL is one example of a standardized location solution for mobile devices that relies on a location server (in this case an SLP) interacting (in this case by user plane signaling using TCP/IP) with a mobile device (in this case referred to as a SET). Location can be computed in SUPL either (i) in the SLP or (ii) in the SET. In case (i), the SLP may provide assistance data to the SET to help the SET acquire and measure the necessary signals (e.g. GPS or Galileo signals) after which the SET returns measurements to the SLP which can the SLP can use to compute a location estimate. In case (ii), the SLP may provide assistance data to the SET both to assist signal acquisition and measurement and to enable computation of a location estimate which can then be provided to the SLP if the SLP was requesting the SET's location. Other standardized location solutions also exist that rely on control plane signaling between a location server and mobile device. With control plane signaling, location related messages are sent over existing network interfaces along with other network signaling instead of being sent as part of data traffic as in a user plane solution like SUPL. Examples of Control Plane location solutions include: the 3GPP solution for Long Term Evolution (LTE) defined in the 3rd Generation Partnership Project (3GPP) Technical Specifications (TSs) 23.271 and 36.305; the 3GPP Solution for Wideband Code Division Multiple Access (WCDMA) defined in 3GPP TSs 23.271 and 25.305; the 3GPP Solution for the Global System for Mobile communications (GSM) defined in 3GPP TSs 23.271 and 43.059; and the 3rd Generation Partnership Project 2 (3GPP2) solution for Code Division Multiple Access 2000 (cdma2000) defined in 3GPP2 TSs C.S0022 and X.S0002.

In both control plane and user plane location solutions, privacy of the user whose mobile device is being located can be a critical requirement. The normal goal is to make the location of the user readily available to external clients (which may comprise human users as well as automated entities such as servers and the like) for which permission by the user currently exists or is provided at the time of a location request and unavailable otherwise. A problem with fulfilling this requirement can be to reliably identify any external client and obtain the consent of the user with as little inconvenience to the user as possible. Thus, for example, alerting the user to every single location request that may be made and waiting for the user to accept or deny the request may be a poor solution since it may in itself be invasive of the user's preference to avoid excessive interaction with the network. Additionally, location solutions that cannot fully identify an external client may cause problems in denying location to an external client when the user is actually willing to allow location. These problems may become especially significant for external clients known to and trusted by the user but not known to or trusted by the network or by a location server. A need therefore exists to improve the handling of location privacy.

The method of supporting location privacy is here exemplified for the SUPL location solution although it will be clear to those versed in the art that the solution may be equally applied to other solutions such as the various 3GPP and 3GPP2 control plane solutions referred to above.

In some SUPL implementations, different external clients, referred to, e.g., as SUPL Agents, may request location estimates for one or more SETs from an SLP. In some implementations, location request messages may be received and processed by an SLP, and location estimates for requested SETs may be transmitted by an SLP to SUPL Agents based at least partially on known and verified identities of the SUPL Agents and a pre-existing agreement by SET users for allowing location provision to these SUPL Agents. In other implementations, an SLP may need to interact with a SET to notify the SET and/or the SET user of the identity (e.g. a name or address) of a SUPL Agent in order to obtain an explicit permission or denial for providing location. In these implementations, if an identity of a SUPL Agent cannot be fully and reliably obtained or if the SET or the SET user does not respond to a request to allow or deny the location request, the SLP may either (i) reject the request and thereby potentially deny location to a SUPL Agent that is actually trusted by the user, or (ii) allow the request and thereby risk breaching the privacy of the user. Accordingly, in some implementations, security or privacy may be a concern, e.g., because some individuals associated with SETs might not want just any SUPL Agent to have an ability to acquire location estimates for the SETs. To address privacy and security concerns, one or more implementations as discussed below may assign and utilize location uniform resource identifiers (URIs) to control access to or dissemination of location estimates for particular SETs.

A "location Uniform Resource Identifier," or "location URI," or "location identifier" as used herein may refer to an identifier capable of identifying a particular entity, such as a mobile device, and a means for querying a particular location server for the location of the particular entity. The terms "location URI" and "location identifier" are used synonymously herein. A location URI may comprise a string of printable characters that begins with an identification of the type of location URI and a protocol to be used for dereferencing the location URI. A location URI may also comprise an identity of a location server from which the location can be obtained and an identity of an entity (e.g., a mobile device) whose location is to be obtained. An overall structure and content of a location URI may conform to the Internet Engineering Task Force (IETF) Request for Comments (RFC) 3986 and RFC 5808. The protocol to be used for dereferencing may comprise the Session Initiation Protocol (SIP) as defined in IETF RFCs 3261 and 3856 or may comprise an extension of the HTTP-Enabled Location Delivery (HELD) protocol defined in IETF RFC 5985 or some other protocol. An identity of a location server may comprise an IP address, a fully qualified domain name, or some other network address. An identity of the entity, which may comprise a mobile device with respect to one or more embodiments discussed herein, may be provided as a pseudo-random sequence of characters meaningful only to the server in order to hide and protect the real identity of the mobile device—e.g., from other entities that may be able to intercept or otherwise obtain unauthorized access to the location URI. A recipient of a location URI may use a protocol indicated in a location URI to request the location of the mobile device identified in the location URI from the location server identified in the location URI. This procedure whereby a location URI is used to obtain a location may be referred to or known as "dereferencing" and the protocol used may be referred to or known as a "dereferencing protocol."

In an implementation, a location URI may be created or provisioned by a location server (such as a location server indicated in a location URI) for a specific mobile device (e.g., the mobile device identified in the location URI) and transferred to some other entity which may later use the location URI to query for the location of the mobile device. If the server receives such a query, it may obtain the location of the mobile device—for example, using SUPL—and may return the location to the requesting entity. Security and privacy may subsequently comprise an issue needing to be addressed by the location server and mobile device.

In some implementations, locations URIs may be defined for support by location protocols defined by the IETF. However, in such implementations, it may not be possible to assign or make use of a location URI via use of SUPL messaging, such as SUPL 3.0 messaging.

A location URI previously obtained by a SET from a location server (e.g., an SLP) may be transmitted from a SET to a trusted entity so that the trusted entity has an ability to subsequently request a location estimate of the SET. For example, if a location estimate for a SET is only transmitted or otherwise disseminated to a trusted entity which has knowledge of location URI, dissemination of a location estimate for the SET may effectively be controlled or limited. A "trusted entity," as used herein may refer to an entity known to be acceptable or known to respect certain privacy considerations relating to dissemination of information relating to a mobile device, such as a SET. For example, a trusted entity may comprise a particular entity such as an H-SLP, SUPL Agent, or external client known to utilize location estimates for a particular SET for applications deemed to be acceptable or approved by a user of the SET.

In an example implementation, a trusted entity E1 may comprise an entity trusted by some entity E2. Entity E2 may transfer information to entity E1 with a high confidence that the information will not be subsequently transferred by entity E1 to some other entity E3 not trusted by the entity E2. For example, entity E2 may comprise a SET and entity E1 may comprise an external client or SUPL Agent. In this example, entity E1 may transfer information received from entity E2 to an H-SLP for entity E2 because an H-SLP is typically trusted by a SET. However, entity E2 may not transfer information received from entity E1 to some other external client or SUPL Agent not known by entity E1 to be trusted by entity E2 without explicit permission of entity E2, for example.

In one particular implementation on the other hand, as discussed below, a location URI be assigned and utilized via SUPL messaging. A location URI may provide a reference to a location of some entity such as mobile device and which may be obtainable from a particular location server such as, e.g., a SUPL SLP. Location URIs may be defined for support by location protocols defined by IETF. A mobile device may, for example, comprise a SUPL Enabled Terminal (SET). A location URI may be provided by a location server to a user device or mobile device such as a SET. For example, a location URI may be provided to a user device upon request by the user device to the location server and the URI may identify the location server, the user device, and the protocol to be used to subsequently query the location server using the location URI to obtain the location of the SET. If the location server is queried with the location URI, the location server may obtain a current location of a referenced SET or other user devices and return this information to the sender of the query.

A location URI may be assigned by an SLP to a SET using SUPL and subsequently transferred by the SET to some other client entity trusted by the SET. The client entity may subsequently use the location URI to query the SLP for the location of the SET. The SLP may not be able to identify or fully identify the identity of the client entity and/or may not be able to determine whether location of the SET is to be allowed by the SET or SET user. Nevertheless, the SLP may assume that because the client entity provided the location URI previously transferred to the SET, the client entity may be trusted by the SET and/or SET user. Hence, the SLP may instigate a SUPL location session with the SET to obtain the SET's location. The initial SUPL message (e.g., a SUPL INIT message) transferred to the SET by the SLP as part of this session may contain the location URI. In this case, the presence of the location URI (e.g., matching the location URI previously received from the SLP by the SET) may be used to inform the SET that the location request received from the SLP was originated or authorized by the trusted client entity to which the SET had previously transferred the location URI. The SET may assume, for example, that because the location URI was transferred to the trusted client entity and subsequently received in a SUPL location request from the SLP that the trusted client entity must have used the location URI to request the SET's location from the SLP. This assumption may be reliable if, for example, the location URI was not intercepted by or transferred (e.g., by the SLP or trusted client entity) to some other non-trusted entity—in other words, if the SLP and trusted client entity behave in a trusted manner and all communication is secure. The SET may subsequently permit the location request and may avoid notifying the user unless the user specifically requests to be notified for this trusted client entity, for example. This result may support a user's privacy requirements, avoid unnecessary solicitation of the user and reliably provide the SET and SET user's location to the trusted client entity without unnecessary delay.

In one example application, a SET may initiate an emergency call, request a location URI from a local SLP and forward the location URI to a Public Safety Answering Point (PSAP) along with an emergency call establishment request. The SET may be informed at some later point that the PSAP is requesting its location if the local SLP sends the SET the same location URI in the SUPL INIT message that is used to begin the location of the SET.

FIG. 1 is a diagram of a communication system 100 supporting an exchange of SUPL messages according to one implementation. Communication system 100 may include various entities such as a serving network 105, a home network 110 and a mobile device or SET 115. A serving network may provide access (e.g., wireless access) to a mobile device such as SET 115 and may enable SET 115 to perform communication and/or other services (e.g., connect to the Internet and make voice and data calls). A home network may, for example, comprise a network in which a mobile device such as SET 115 is registered and in which an associated user has a subscription for certain services such as an ability to make voice and data calls, send and receive messages and email and connect to the Internet. A home network may provide access (e.g., wireless access) when a subscribed mobile device such as SET 115 is within its coverage area. One or more satellite vehicles (SVs) 120 may transmit navigation signals which may be received by SET 115. It should be appreciated that although only a single SV 120 is shown in FIG. 1, additional SVs, such as four or more, may be in communication with SET 115 to provide location data and enable signal measurements such as pseudorange measurements.

Serving network 105 may contain or be associated with a Discovered-SLP (D-SLP) 125, a serving core network 130, and an access network 135. D-SLP 125 may provide location services using SUPL for SET 115 in the geographic area served by serving network 105. For example, D-SLP 125 may enable SET 115 to request and receive location assistance data and support location requests for SET 115 from external entities. Serving core network 130 may provide support for communication between SET 115 and various other entities including D-SLP 125 and Home Network 110. Access network 135 may provide wireless access and communication for SET 115 using a particular wireless technology such as Long Term Evolution (LTE), Wideband Code Division Multiple Access (WCDMA), Global System for Mobile Communications (GSM), Code division multiple access 2000 (cdma2000), WiFi, or WiMax, to name just a few among many examples. Access network 135 may also connect SET 115 to serving core network 130. Access network 135 may comprise one or more base stations, access points or other wireless capable devices. Serving core network 130 may comprise Mobility Management Entities (MMES), Serving Gateways (SWGs) and Public (or Packet) Data Network Gateways (PDGs) in the case of LTE access or other entities in the case of WCDMA, GSM, cdma2000 etc. access.

Home network 110 may contain or be associated with a Home-SLP (H-SLP) 140 for SET 115 and a home core network 145. H-SLP 140 may comprise a location server normally used by SET 115 to obtain location services using SUPL and may specifically authorize D-SLP 125 to provide location services for SET 115 while SET 115 is remote from H-SLP 140 in the area served by serving network 105. Home core network 145 may comprise one or more MME, SWG, and/or PDG in the case of LTE access or other entities in the case of other types of access. A SUPL Agent 150 may be in communication with home core network 145 or with serving core network 130 (not shown in FIG. 1). In some cases, serving network 105 and home network 110 may comprise same network (not shown in FIG. 1).

In some implementations, location data and signals that may be measured to derive location may be provided by, for example, terrestrial transmitters (e.g., base stations or WiFi access points) within access network 135 of serving network 105 or another electronic device, for example, in a wireless local area network (WLAN), wireless wide area network (WWAN) and/or wireless personal area network (WPAN).

In some implementations, SET 115 may comprise a device such as, for example, a laptop computer, a personal digital assistant (PDA), other low duty cycle devices, or a mobile phone device, just to name a few examples. SET 115 may estimate its location based at least in part on navigation signals from an SPS, such as GPS, Galileo or Glonass by, for example, obtaining pseudorange measurements to four or more SV transmitters. Alternatively, SET 115 may estimate its location based at least in part on measurement of signals received from terrestrial transmitters in access network 135 or in other access networks not shown in FIG. 1. SET 115 may also or alternatively utilize internal sensors to compute its change of location and combine this with measurements of SVs and/or terrestrial transmitters to obtain its location. SET 115 may additionally obtain its location based at least partially on other techniques.

In one implementation, SUPL agent 150 may remotely monitor or track a location of SET 115. For example, in the event that a user transporting SET 115 is lost, needs to find a certain place (e.g., airport, airport gate, hotel, shopping mall)

or experiences a medical emergency and communicates with SUPL agent 150 in this regard, the SUPL agent 150 may desire to acquire a location estimate of SET 115. SUPL agent 150 may comprise an application program executed by a remote computer, computing device, or computing platform. SUPL agent 150 may communicate with H-SLP 140 via home core network 145 or with D-SLP 125 via serving core network 130. Serving network 105 and home network 110 may comprise hard-wired or wireless networks.

In one implementation, SET 115 may be assigned a location URI from D-SLP 125 or some other SLP, such as H-SLP 140, in communication with SET 115. A location URI may subsequently be utilized to request a location estimate for SET 115. For example, a location URI may be transmitted or otherwise provided by SET 115 to a SUPL Agent 150 or some other entity capable of monitoring locations of movement of SET 115. To request a current or updated location estimate for SET 115, SUPL Agent 150 or some other entity may transmit a location request to an SLP, such as D-SLP 125, in communication with SET 115 to acquire a location estimate from SET 115. In one implementation, for example, a location estimate may only be acquired from SET 115 if a location URI assigned to or otherwise associated with SET 115 is included in a location request message sent to SET 115. By requiring an entity requesting a location estimate for SET 115 to provide a location URI assigned to or otherwise associated with SET 115, the dissemination of a location estimate for SET 115 may effectively be controlled to thereby enhance privacy of location estimates for SET 115 and may enable location requests from trusted entities without unnecessary delay or unnecessary interaction with the user of SET 115.

Figure 2A:
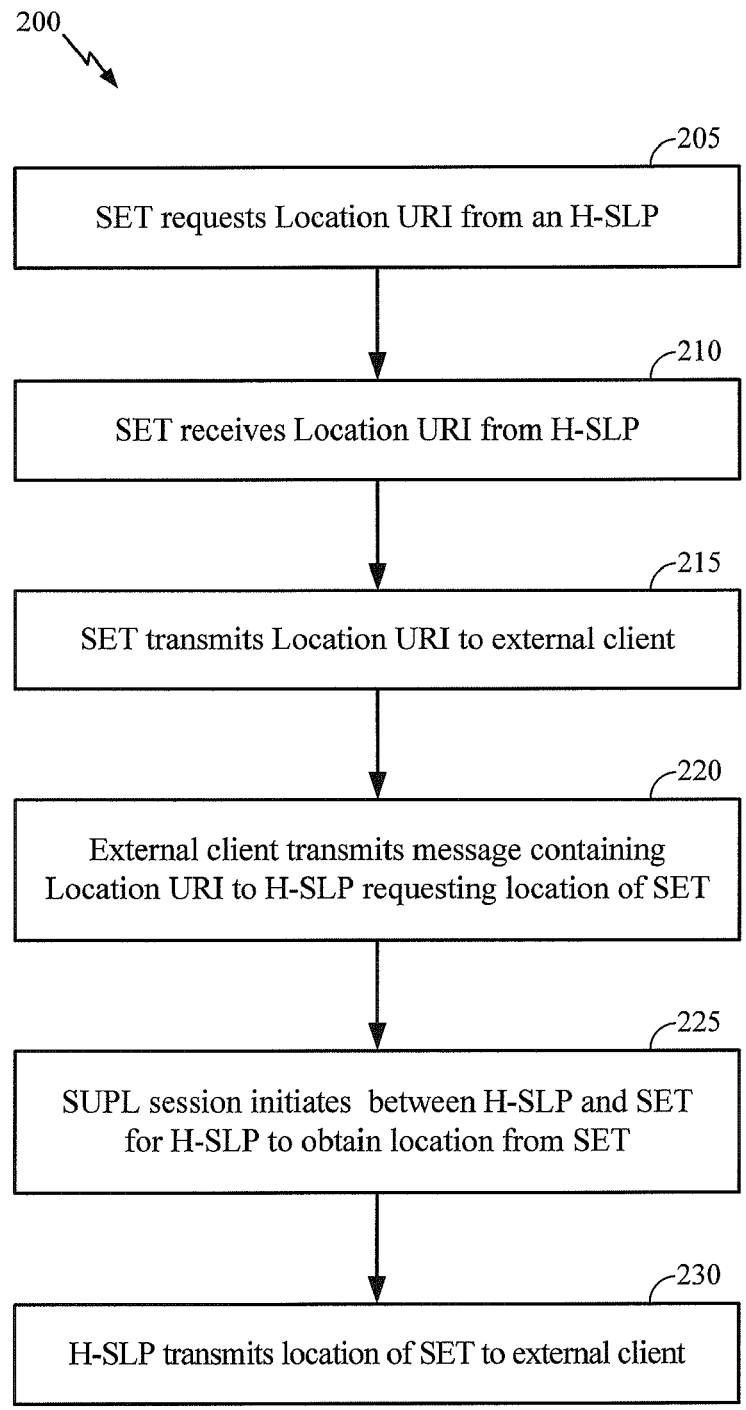
FIG. 2A is a flowchart of a process for provisioning a location URI according to one implementation.
Figure 2B:
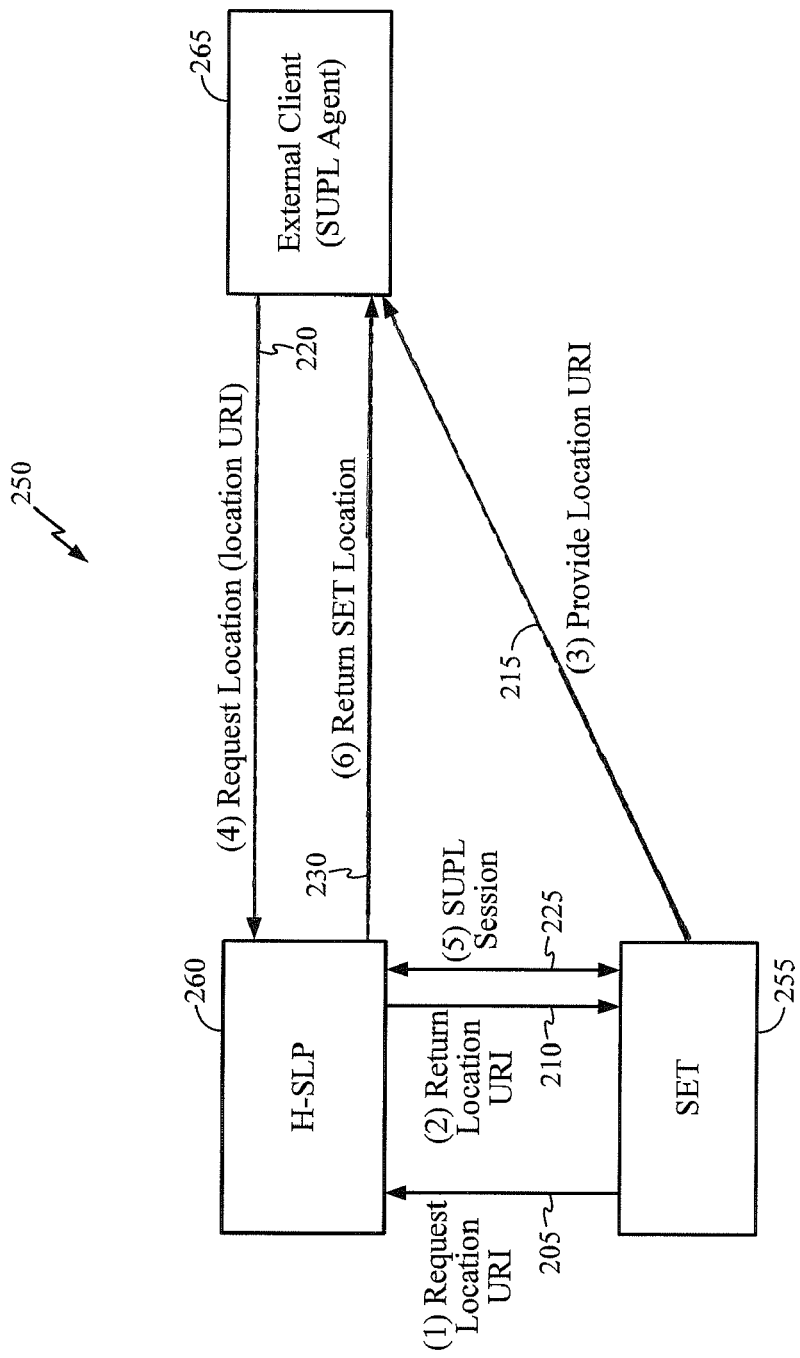
FIG. 2B is a schematic diagram of a system and corresponding message flow for provisioning a location URI according to one implementation.

FIG. 2A is a flowchart of a process 200 for provisioning a location URI according to one implementation. FIG. 2B is a schematic diagram of a system 250 and corresponding message flow for provisioning a location URI according to one implementation. System 250 may implement message flows as discussed herein with respect to FIG. 2A.

A system for implementing process 200 may comprise a SET (e.g., SET 255 in FIG. 2B or 115 in FIG. 1), an H-SLP (e.g., H-SLP 140 in FIG. 1), and an external client (e.g., SUPL Agent 150 in FIG. 1), according to a particular implementation. Implementations in accordance with claimed subject matter may include all of, less than, or more than operations 205-230. Also, the particular order of operations 205-230 is merely an example order. FIG. 2A illustrates a process for provision of a location URI by an H-SLP to a SET and use of the location URI by an external client at some later time to request and obtain the location of the SET. An external client may include a SUPL Agent, for example.

At operation 205, a SET may request a location URI from an H-SLP. An H-SLP may assign or otherwise acquire a location URI for a SET and may transmit the location URI to the SET at operation 210. At operation 215, a SET may transmit its location URI to an external client. The external client may be trusted by the SET—e.g., allowed to request and receive the location of the SET at some later time. A transfer of the location URI by the SET to the External Client in operation 215 may be performed via an interaction at an application level. In one example implementation, an emergency call from a SET to a Public Safety Answering Port (PSAP) may occur where an External Client is part of the PSAP and the location URI is sent to the PSAP in a SIP INVITE message used to establish an emergency call. This particular type of location URI transfer (operation 215) is, for example, supported in a 3GPP Multimedia Subsystem (IMS) Emergency Call solution (e.g., as defined in 3GPP TS 23.167 and TS 24.229).

Referring back to FIG. 2A, at operation 220, an external client may transmit a message containing a location URI for a SET to an H-SLP to request a location estimate for the SET. The location URI may comprise the same location URI that was transferred to the external client in operation 215. Because the location URI was earlier assigned by the H-SLP and transferred to the SET in operation 210, the H-SLP may decide to proceed with the location request even if not able to identify the external client or verify that the SET is willing to allow the location request to proceed. Alternatively, the H-SLP may, if it is able to and possibly in addition to verifying the received location URI, verify the identity of the external client and its authorization to locate the SET. A SUPL session may be initiated by the H-SLP with the SET at operation 225. The first SUPL message transferred by the H-SLP to the SET in operation 225 (e.g., a SUPL INIT message) may convey the location URI received from the external client in operation 220. Because the location URI received from the H-SLP matches the location URI received earlier by the SET in operation 210 and transferred to the external client in operation 215, the SET may decide to allow the location request to proceed and may not necessarily need to notify or wait for permission from the SET user. Alternatively, the SET may, in addition to verifying the received location URI, notify the SET user and wait for explicit permission to allow the location session to proceed and/or may verify that the external client is configured (e.g. by the SET user) in the SET as being authorized to locate the SET. The SUPL session may subsequently proceed in operation 225 with the H-SLP obtaining a location estimate for the SET. After obtaining a location estimate for the SET, the location estimate may be transmitted from the H-SLP to the external client in operation 230.

FIG. 2B is a schematic diagram of a system 250 and corresponding message flow for provisioning a location URI according to one implementation. System 250 may implement message flows as discussed above with respect to FIG. 2A. FIG. 2B illustrates transferred messages and interactions between SET 255, H-SLP 260 and external client or SUPL Agent 265. Each message transfer and its direction are represented by an arrow and each interaction is represented by a double arrow as illustrated. Labels for arrows in FIG. 2B summarize messages or interactions and are numbered according to one possible sequence of events, although it should be appreciated that events may occur in a different sequence in some implementations. The operations shown FIG. 2A that corresponds to each message or interaction are also shown in FIG. 2B.

Figure 3A:
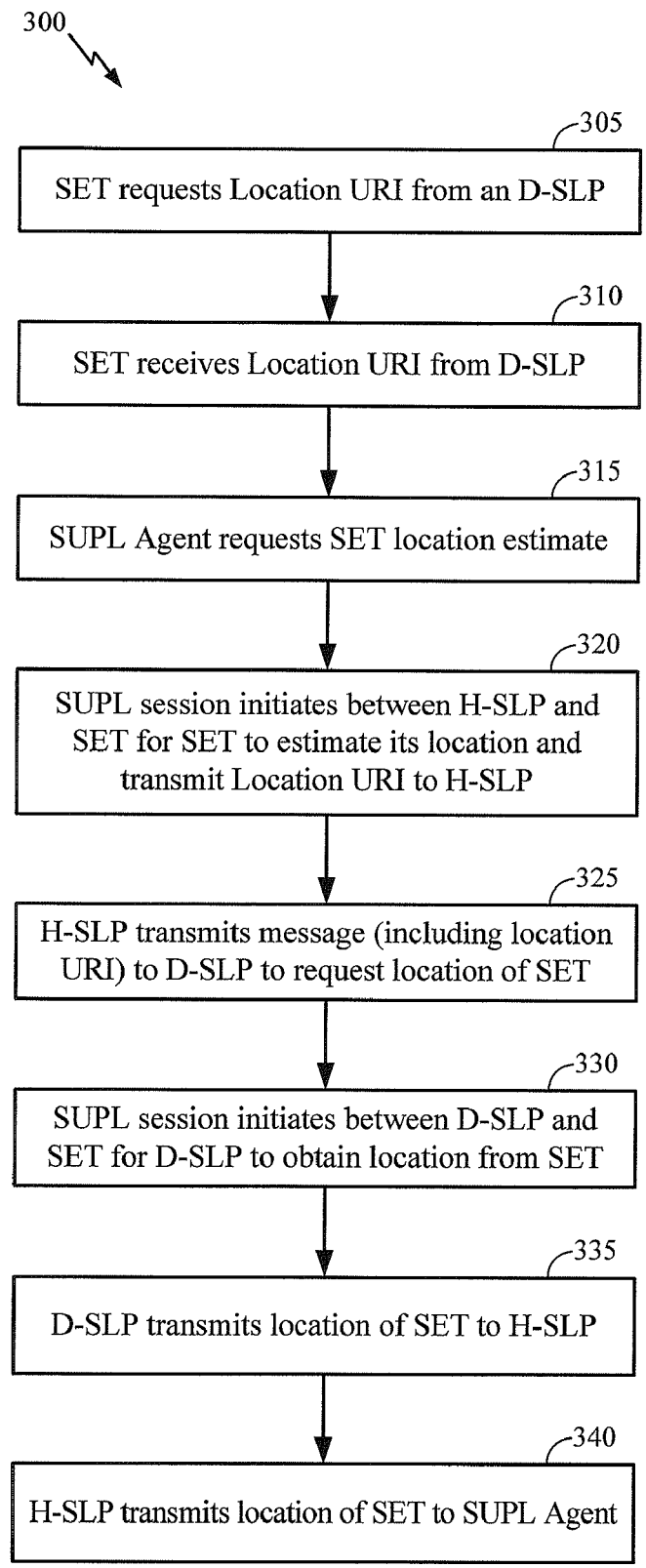
FIG. 3A is a flowchart of a process for provisioning a location URI according to one implementation.
Figure 3B:
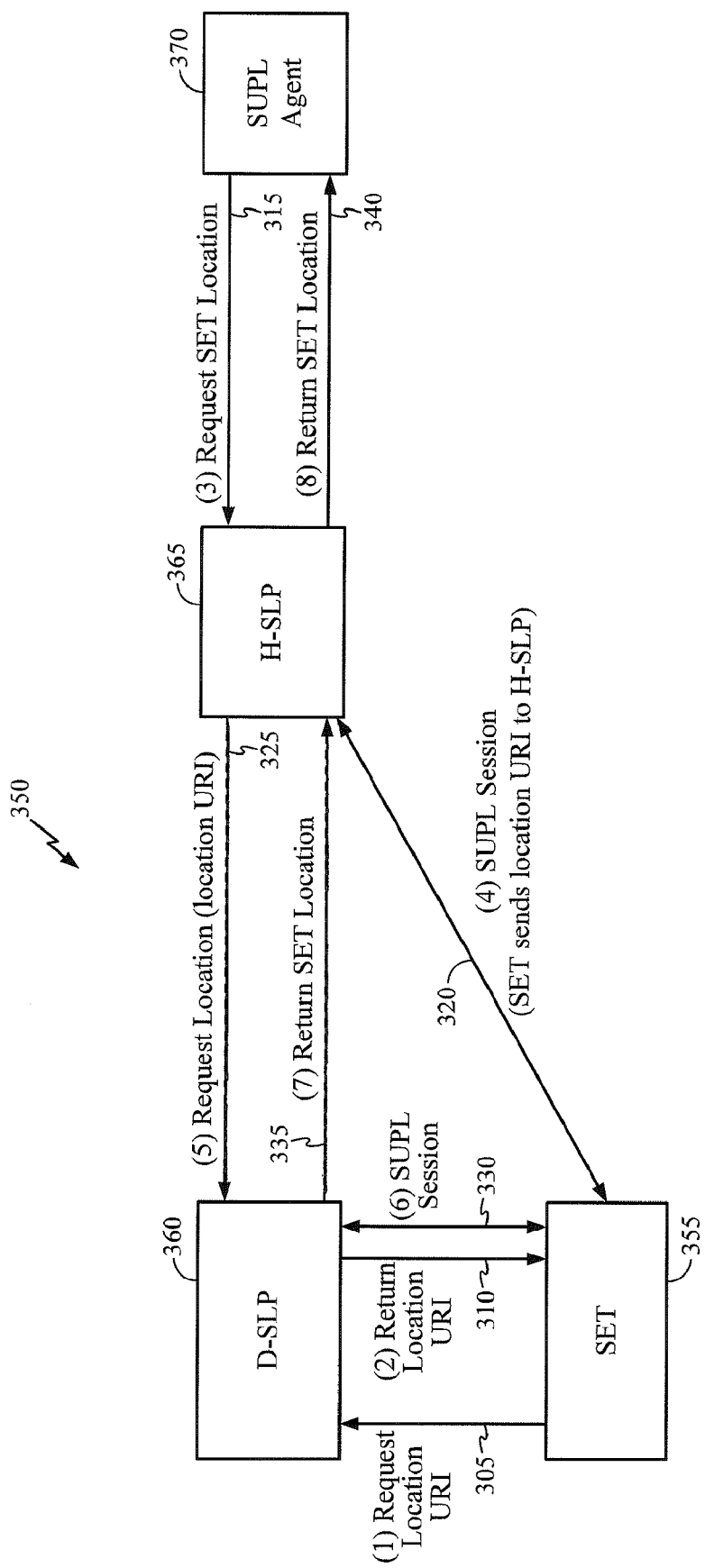
FIG. 3B is a schematic diagram of a system and corresponding message flow for provisioning a location URI according to one implementation.

FIG. 3A is a flowchart of a process 300 for provisioning a location URI according to one implementation. FIG. 3B is a schematic diagram of a system 350 and corresponding message flow for provisioning a location URI according to one implementation. System 350 may implement message flows as discussed herein with respect to FIG. 3A.

A system for implementing process 300 may comprise a SET (e.g., SET 355 in FIG. 3B or SET 115 in FIG. 1), a D-SLP (e.g., D-SLP 360 in FIG. 3B or D-SLP 125 in FIG. 1), an H-SLP (e.g., H-SLP 365 in FIG. 3B or H-SLP 140 in FIG. 1), and a SUPL Agent (e.g., SUPL Agent 370 in FIG. 3B or SUPL Agent 150 in FIG. 1), according to a particular implementation. Embodiments in accordance with claimed subject matter may include all of, less than, or more than operations 305-340. Also, the particular order of operations 305-340 is merely an example order.

At operation 305, a SET may request a location URI from a D-SLP. For example, a SET may transmit a message to a D-SLP to request a location URI. A D-SLP may have an ability to assign or otherwise acquire a location URI for a SET. At operation 310, a location URI may be transmitted via a message from a D-SLP to a SET. At operation 315, a SUPL Agent may request a location estimate for a particular SET. For example, a SUPL Agent may transmit a message to the H-SLP for the SET to request a location estimate for the SET. In one particular implementation, a SUPL Agent may transmit a Mobile Location Platform (MLP) message to an H-SLP to request a location estimate for the SET. The H-SLP may verify the identity of the SUPL Agent and its authorization to request a location for the SET.

At operation 320, a SUPL session may be initiated between the H-SLP and the SET in order to obtain the location of the SET. The H-SLP may identify the SUPL Agent to the SET to allow the SET or SET user to authorize the location session. Alternatively, because the SET may regard the H-SLP as a trusted entity, the SET may allow the location session to proceed based on an assumed authorization by the H-SLP. During the SUPL session, the SET may transfer the location URI obtained from the D-SLP in operation 310 to the H-SLP. The SUPL session may terminate after the H-SLP has received the location URI or after the H-SLP has both received the location URI and obtained a location estimate for the SET. It should be appreciated that the SET may transmit its location URI to the H-SLP prior to a SUPL Agent requesting a location of the SET, in which case operation 320 may be omitted.

At operation 325, the H-SLP may transmit a message to a D-SLP to request a location of the SET. The message may include a parameter or field containing the location URI, for example. The H-SLP may determine or identify the D-SLP based at least in part on a location server identified by the location URI received in operation 320. The H-SLP may decide to contact the D-SLP based at least in part on not having obtained a location estimate or not having obtained an accurate location estimate in operation 320. For example, if the SET is inside a building, the H-SLP may not have sufficient data on the building, local base stations, and/or WiFi access points to be able to locate or accurately locate the SET at operation 320. At operation 330, a SUPL session may be initiated by the D-SLP with the SET for the D-SLP to obtain a location estimate from the SET. The first SUPL message transferred by the D-SLP to the SET in operation 330 (e.g., a SUPL INIT message) may convey the location URI received from the H-SLP in operation 325, The SET may decide to allow the location request to proceed and may not necessarily need to notify or wait for permission from the SET user if the location URI received from the D-SLP matches the location URI received earlier by the SET in operation 310 and which has been transferred to the H-SLP in operation 320. For example, the SET may associate the location request from the D-SLP in operation 330 with the location request from the H-SLP in operation 320 due to inclusion of the same location URI in both operations. Hence, since the SET authorized the location request in operation 320, it may authorize the location request in operation 330 without receiving information on the identity of the SUPL Agent which the D-SLP may not possess. The SUPL session may subsequently proceed at operation 330 with the D-SLP obtaining a location estimate for the SET. After acquiring a location estimate for the SET, for example, the D-SLP may transmit the location estimate to the H-SLP via a message at operation 335. The H-SLP may subsequently transmit the acquired location estimate for the SET to the SUPL Agent at operation 340.

FIG. 3B shows the flow chart of FIG. 3A in terms of transferred messages and interactions between the SET 355, D-SLP 360, H-SLP 365 and SUPL Agent 370. Each message transfer and its direction are represented by an arrow and each interaction is represented by a double arrow as illustrated. Labels for arrows in FIG. 3B summarize messages or interactions and are numbered according to one possible sequence of events, although it should be appreciated that events may occur in a different sequence in some implementations. The operations shown FIG. 3A that corresponds to each message or interaction are also shown in FIG. 3B.

If an H-SLP or some other entity requests a location estimate for a particular SET but fails to supply the correct location URI to the SET or to the SLP that initially provided the location URI, access to the location estimate may be selectively inhibited by the SET or SLP, respectively, to prevent dissemination of the location estimate to entities which do not know the correct location URI and thus may not be entitled to receive the SET's location. In other words, if request contains an incorrect location identifier that is different from the location identifier previously transmitted to the mobile station, access to the location estimate may be selectively inhibited to the requesting entity.

In some implementations, an SLP that provides a location URI to a SET may also provide a time period during which the location URI is considered valid. The SET may provide this time period to an external entity to which the location URI is transferred. If the SLP or SET receives a location request for the SET comprising the location URI at a time after the time period for the location URI has expired, the SLP or SET, respectively, may reject the location request because the location URI is no longer valid. An SLP may also provide more than one location URI to a SET such as, for example, location URIs that reference different dereferencing protocols. The SET may subsequently transfer some or all of the received location URIs to a trusted external entity and may later receive a location request from the SLP containing one of these location URIs. The SET may thereafter authorize the location request based at least in part on receiving the one location URI.

There are different types of message flows relating to provisioning of a location URI and/or acquiring a location estimate of a SET, as discussed further below. There are different types of messages which may be transmitted or received in accordance with a SUPL protocol, such as SUPL 3.0, for example.

A "SUPL INIT" may comprise a SUPL message to initiate a SUPL session that is transmitted from an SLP, such as an H-SLP, D-SLP, or an Emergency-SLP (E-SLP), for example, to a SET in a network-initiated interaction. A "SUPL SET INIT" may comprise a SUPL message to initiate a SUPL session that is transmitted from a SET to an SLP (e.g., an H-SLP or D-SLP) to initiate a location request for another target SET. A "SUPL START" may comprise a SUPL message to initiate a SUPL session that is transmitted from a SET to an SLP (e.g., an H-SLP, D-SLP or E-SLP). A "SUPL RESPONSE" may comprise a SUPL message transmitted by an SLP at least partially in response to receipt of a SUPL START message. A "SUPL POS INIT" may comprise a SUPL message transmitted by a SET to an SLP after a SUPL INIT message in a network-initiated SUPL session or a SUPL RESPONSE message in a SET-initiated SUPL session has been received from the SLP. A "SUPL POS" may comprise a SUPL message sent by either an SLP or a SET that contains an underlying positioning protocol message (e.g., for TIA-801 defined in 3GPP2 C.S0022, Radio resource location services (LCS) protocol (RRLP) defined in 3GPP TS 44.031, Radio Resource Control (RRC) defined in 3GPP TS 25.331, or LTE Positioning Protocol (LPP) defined in 3GPP TS 36.355). A SUPL POS message may further contain additional information such as velocity. A "SUPL END" may comprise a SUPL message sent by either an SLP or a SET, for example, which ends a SUPL session normally or abnormally.

One or more SUPL messages may include a field or parameter for a location URI set, for example. A Location URI Set parameter may provide one or more location URIs each of which may comprise a URI, for example as defined in IETF RFC 3986, that references a means to obtain the location of the SET from a particular location server that initially created the location URI. A location server may comprise a SUPL SLP or some other type of server and may be identified within the location URI. A dereferencing protocol used to obtain a SET location using the location URI (e.g. via a query/response operation) may similarly be defined within a location URI for example as defined in IETF RFC 3986. Possible examples of a dereferencing protocol include SIP SUBSCRIBE/NOTIFY as defined in IETF RFC 3856 and an extension of the HELD protocol defined in IETF RFC 5985. In creating a Location URI Set, an SLP may, for example, include one location URI for each location dereferencing protocol that it supports. A Location URI Set parameter may further include a validity period during which each location URI in the Location URI Set parameter will remain valid.

A Location URI Request parameter may indicate or contain a request from a SET for a location URI from an SLP. A Location URI Request parameter may be utilized in a SUPL message transmitted from a SET to an SLP, such as an H-SLP or a D-SLP, to indicate a request for a location URI. A Location URI Request parameter may provide a reason for requesting a location URI. Possible reasons for requesting a location URI include location support for an emergency session or location support for an H-SLP, to name just a couple of possible example reasons. A Location URI Request parameter may further include a preferred validity period during which any provided location URI will remain valid.

Another parameter which may be utilized in a SUPL message is an Extended Notification parameter. An Extended Notification parameter may provide additional notification information to a SET for a network-initiated SUPL session from an SLP. For example, an Extended Notification parameter may comprise a location URI and may indicate that a SET location is being obtained by the SLP as a consequence of receiving a location request containing the location URI. In one particular implementation, an Extended Notification parameter may be utilized by the SET to authorize the location request if the same location URI was previously transferred to the SET by the SLP and if any validity period provided by the SLP to the SET for the location URI has not yet expired. If, for example, a SET has previously forwarded a location URI to another entity in a secure manner (e.g., to an H-SLP or an external SUPL Agent), the SET may know that its location is being requested by the particular entity.

Figure 4:
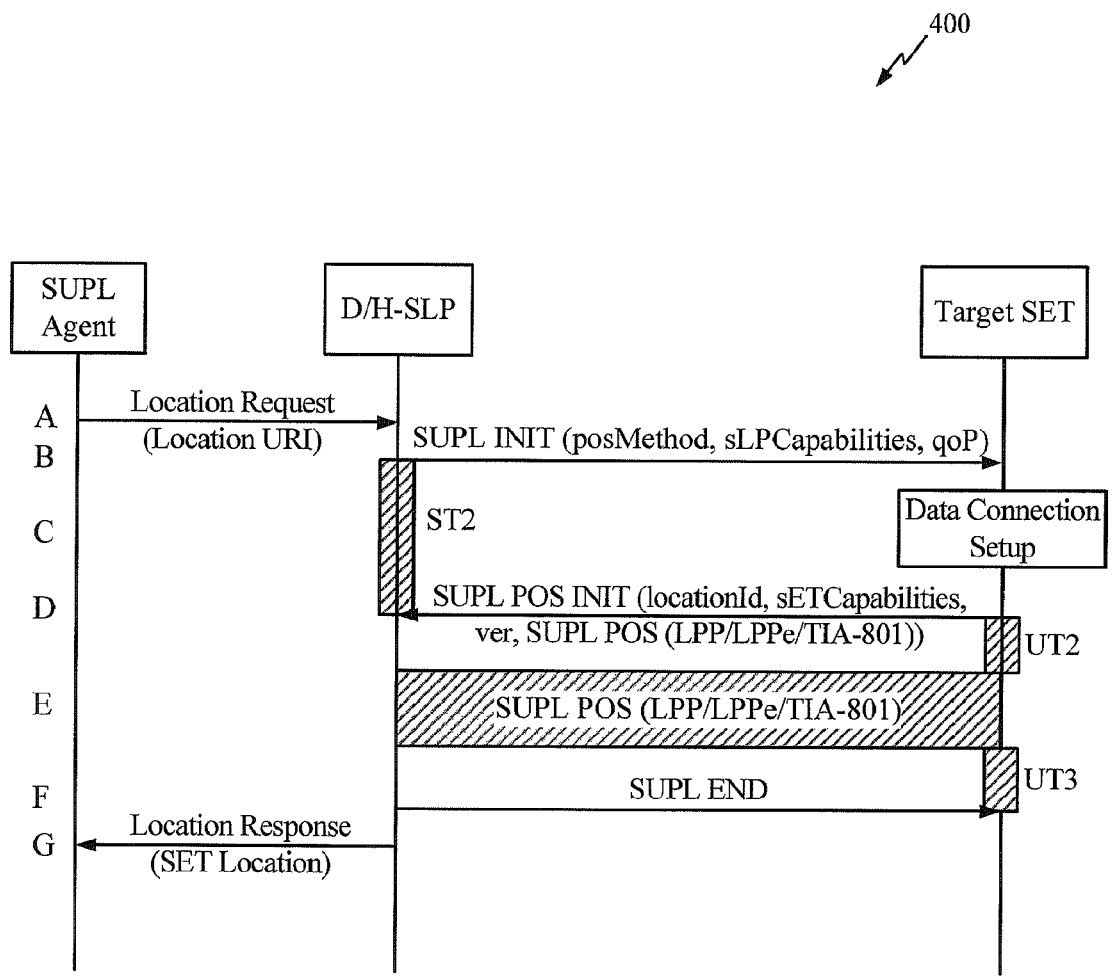
FIG. 4 is a message flow diagram illustrating example message flows relating to an SLP-initiated request for a location estimate for a SET where a location URI is included in a SUPL INIT message in accordance with one particular implementation.

FIG. 4 is a message flow diagram 400 illustrating example message flows relating to an SLP-initiated request for a location estimate for a SET where a location URI is included in a SUPL INIT message in accordance with one particular implementation.

At operation A, a SUPL Agent (e.g., SUPL Agent 150 as shown in FIG. 1) may transmit a Location Request message to an H-SLP (e.g., H-SLP 140 in FIG. 1) or D-SLP (e.g., D-SLP 125 in FIG. 1) with which the SUPL Agent is associated. A transmitted Location Request may include a location URI to reference a particular SET (e.g., SET 115 shown in FIG. 1) for which the location is desired. The SUPL Agent may have previously received the Location URI from the SET (e.g., as described in FIG. 2A for operation 215) and the SET may have previously received the Location URI from the SLP— e.g. as described later for FIG. 5. The H-SLP or D-SLP (denoted as D/H-SLP in FIG. 4) may or may not authenticate the SUPL Agent and may or may not determine whether the SUPL Agent is authorized for the service requested. The D/H-SLP may determine the target SET from the received Location URI—for example from a pseudo-random character string in the Location URI which the D/H-SLP previously assigned when the Location URI was first created by the D/H-SLP. The D/H-SLP may further assume that location of the SET is permitted by the SET or SET user based at least in part on the received Location URI matching the Location URI that was previously transferred to the SET (e.g., by an operation not shown in FIG. 4). The D/H-SLP may verify whether the target SET supports SUPL. If a previously computed position is available at the D/H-SLP and no notification and verification is required by the SET, the D/H-SLP may directly proceed to operation G. On the other hand, if notification and verification or notification only is or may be required, the message flow may proceed to operation B.

At operation B, the D/H-SLP may initiate a SUPL location session with the target SET by sending a SUPL INIT message. A SUPL INIT message may contain one or more of the following: an intended positioning method (e.g., posMethod), SLP Capabilities (e.g., sLPCapabilities), a Quality of Positioning (QoP), and the location URI received in operation A. The location URI may be included in an Extended Notification parameter in the SUPL INIT. If a result of a privacy check in operation A indicates that notification and/or verification of the target SET is needed, the D/H-SLP may also include a Notification parameter in the SUPL INIT message. The D/H-SLP may also compute and store a hash of the SUPL INIT message prior to transmitting the SUPL INIT message. If in operation A, the D/H-SLP decided to use a previously computed position, the SUPL INIT message may indicate use of this previously computed position in a "no position" posMethod parameter value. In the case of using a previously computed position, the SET may respond with a SUPL END message comprising the results of any required verification process (e.g., access granted or access denied) after the SET has inspected the included Location URI as described further down for operation C. The H-SLP may subsequently proceed to step G. Prior to transmitting the SUPL END message, the SET may perform the data connection setup procedure of operation C discussed below and may utilize procedures discussed below with respect to operation D to establish a TLS connection to the D/H-SLP.

If a previously computed position is not being used by the H-SLP, then at operation C, the SET may analyze the received SUPL INIT message. If found not to be authentic, a SET may not undertake further action. Otherwise, the SET may perform any required notification and verification, for example. Since a location URI is included by the D/H-SLP in operation B, the SET may verify whether (i) the same location URI was received earlier from the same D/H-SLP and, if so, whether (ii) any validity period for the location URI has not yet expired and whether (iii) the location URI was transferred by the SET to one or more trusted external clients. If all three conditions are satisfied, for example, the SET may assume that the location request being initiated by the D/H-SLP in operation B was instigated by a trusted external client to which the SET has earlier sent the location URI. Accordingly, the SET may undertake a required action to prepare for establishment of a TLS connection with the D/H-SLP. The SET may also calculate a hash of the received SUPL INIT message. If one or more of the three conditions are not satisfied, the SET may reject the location request by returning a SUPL END as described above for operation B and the D/H-SLP may proceed to operation G.

At operation D, the SET may establish a TLS connection to the D/H-SLP using a D/H-SLP address which may either be an H-SLP address provisioned in the SET by the Home Network for the SET (e.g., home network 110 in FIG. 1) or a D-SLP address provided or verified by the H-SLP or by a Proxy D-SLP authorized by the H-SLP, for example.

Referring back to operation D, the SET may subsequently transmit a SUPL POS INIT message to the D/H-SLP to start a positioning session with the D/H-SLP. The SET may transmit a SUPL POS INIT message even if the SET does not support an intended positioning method indicated in the SUPL INIT message in operation B, for example. The SUPL POS INIT message may contain a Location ID (location Id and not to be confused with a Location URI or Location Identifier) containing, for example, the identities of and measurements for nearby base stations, SET capabilities (sETCapabilities), and/or a hash (ver) of the received SUPL INIT message calculated in operation C in an example implementation. The SUPL POS INIT message may also include a SUPL POS message carrying LPP/LPP extensions (LPPe) and/or TIA-801 positioning protocol messages in line with the D/H-SLP's positioning protocol capabilities (e.g., as indicated in operation B in sLPCapabilities). The SET may also provide its position, if this is supported (as part of LPP/LPPe/TIA-801 or explicitly through an optional position parameter). If a position retrieved in—or calculated based on information received in—the SUPL POS INIT message is available that meets a required QoP, the D/H-SLP may directly proceed to operation F and avoid engaging in a SUPL POS session.

At operation E, the SET and the D/H-SLP may engage in a SUPL POS message exchange to calculate a position of the SET. Positioning methods used for this session may be determined based at least in part on capabilities exchanged by the SET and the D/H-SLP during a SUPL POS message exchange or optionally in operation D. The D/H-SLP may calculate a location or position estimate based at least in part on received positioning measurements (e.g., SET-Assisted) or a SET may calculate its location or position estimate based at least in part on assistance obtained from the D/H-SLP (e.g., SET-Based).

At operation F, after a position calculation has been completed, the D/H-SLP may transmit a SUPL END message to the SET indicating that the SUPL location session has ended. The SET may release any TLS connection to the D/H-SLP and release all resources related to this session at least partially in response to receiving the SUPL END message.

At operation G, the D/H-SLP may transmit a location or positioning estimate (e.g., posresult) to the SUPL Agent via a Location Response message and the D/H-SLP may release all resources related to this session.

Figure 5:
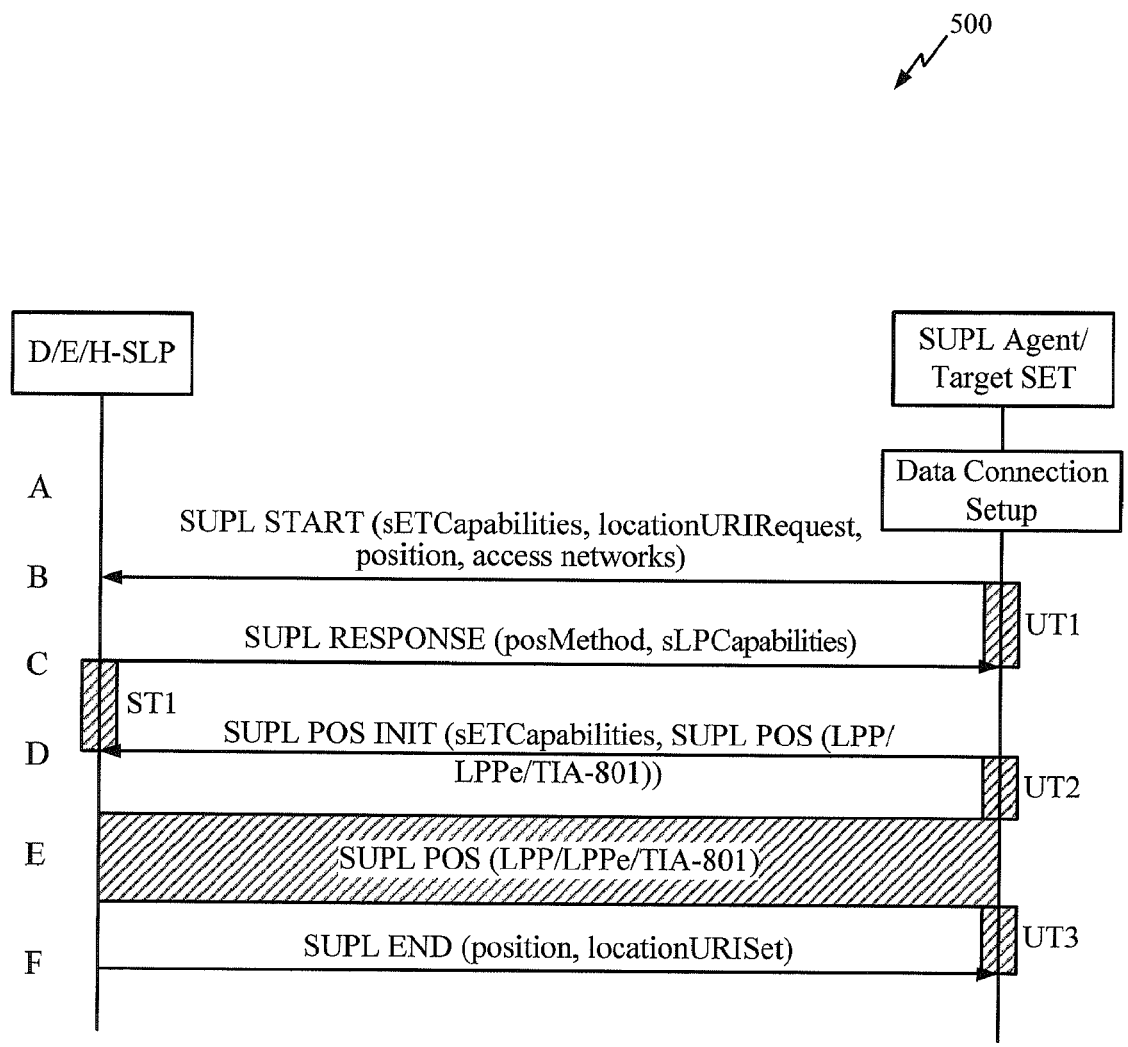
FIG. 5 is a message flow diagram chart illustrating example message flows relating to a SET-initiated location URI request in accordance with one particular implementation.

FIG. 5 is a message flow diagram chart 500 illustrating example message flows relating to a SET-initiated location URI request in accordance with one particular implementation. At operation A, a SET (e.g., SET 115 in FIG. 1) may receive a request for a location URI from a SUPL Agent (e.g., an application) executed by or otherwise running on the SET. For example, a SUPL Agent implemented by or running on the SET may desire or need a location URI to transfer to a PSAP in a request (e.g., a SIP INVITE) for an emergency call or the SUPL Agent may desire or need a location URI to transfer to some other trusted external client to enable later location of the SET by the trusted external client—e.g., as exemplified in FIGS. 2A, 2B, 3A and 3B. A SET may undertake an appropriate action to establish a secure TLS connection to a D-SLP or H-SLP (hereafter referred to as a D/H-SLP) in the case of a normal SUPL Agent or to an E-SLP in the case of a SUPL Agent known to support only emergency services.

At operation B, the SET may utilize a default address provisioned by a Home Network for an H-SLP or an address provided or verified by the H-SLP or a Proxy D-SLP for a D-SLP or E-SLP to establish a secure TLS connection to the D-SLP, E-SLP or H-SLP, hereafter referred to as the D/E/H-SLP, and may thereafter transmit a SUPL START message to start a positioning session with the D/E/H-SLP. The SUPL START message may contain SET capabilities (e.g., sETCapabilities) and a location URI Request (e.g., locationURIRequest parameter). For a request to an E-SLP, for example, the SUPL START message may also contain an Emergency Services Indication (e.g., emergencyServicesIndication parameter). The SET may include an identity of its serving access network(s) and its current location or position estimate if either is available, for example.

At operation C, the D/E/H-SLP may transmit a SUPL RESPONSE message to the SET. The SUPL RESPONSE message may contain an intended positioning method (e.g., posMethod) and/or SLP Capabilities (e.g., sLPCapabilities). In one particular implementation, a D/E/H-SLP may avoid operations C, D and E and instead proceed to operation F if it does not need to obtain a location or position of the SET or verify any position provided in operation B.

At operation D, the SET may transmit a SUPL POS INIT message even if the SET does not support an intended positioning method indicated in the SUPL RESPONSE. The SUPL POS INIT message may contain the SET's capabilities (e.g., sETCapabilities parameter) and optionally a SUPL POS message carrying LPP, LPP/LPPe and/or TIA-801 positioning protocol messages compliant with the D/E/H-SLP's positioning protocol capabilities (e.g., as indicated in operation C in parameter sLPCapabilities). The SET may further provide its location or position estimate, if supported (e.g., as part of an LPP/LPPe/TIA-801 positioning protocol message or explicitly through an optional SUPL position parameter). If a location or position retrieved in—or calculated based at least in part on information received in—the SUPL POS INIT message is available that meets a required QoP, the D/E/H-SLP may directly proceed to operation F and avoid engaging in a SUPL POS session.

At operation E, the SET and the D/E/H-SLP may engage in a SUPL POS message exchange to calculate a location or position. Positioning methods used for this session may be determined based at least in part on capabilities exchanged by the SET and the D/E/H-SLP during the SUPL POS message exchange or optionally in operation D. The D/E/H-SLP may calculate a position estimate based at least in part on received positioning measurements (e.g., SET-Assisted) or the SET may calculate the position estimate based at least in part on assistance obtained from the D/E/H-SLP (e.g., SET-Based).

At operation F, after a position calculation has completed, the D/E/H-SLP may transmit a SUPL END message to the SET to indicate that the SUPL location session has ended and may include a Location URI Set (e.g., locationURISet parameter) if the SET is authorized to receive the Location URI Set. The locationURISet parameter may contain one or more location URIs and may contain the validity period during which the location URIs will remain valid. A location URI may identify a protocol to be used for dereferencing (e.g., as described for operation 220 in FIG. 2A and operation 325 in FIG. 3A), the D/E/H SLP and the SET. The SET identification may comprise any pseudo-random sequence of characters and may be stored in the D/E/H-SLP in association with the real identity of the SET. The D/E/H-SLP may further provide any location or position estimate computed in operation E if operation E was performed. The SET may provide the location URI or location URIs received in operation F to the SUPL Agent and may release the TLS connection to the D/E/H-SLP and release all resources related to this SUPL session at least partially in response to receiving the SUPL END message. The D/E/H-SLP may also release all resources related to this SUPL session upon transmitting the SUPL END message.

Figure 6:
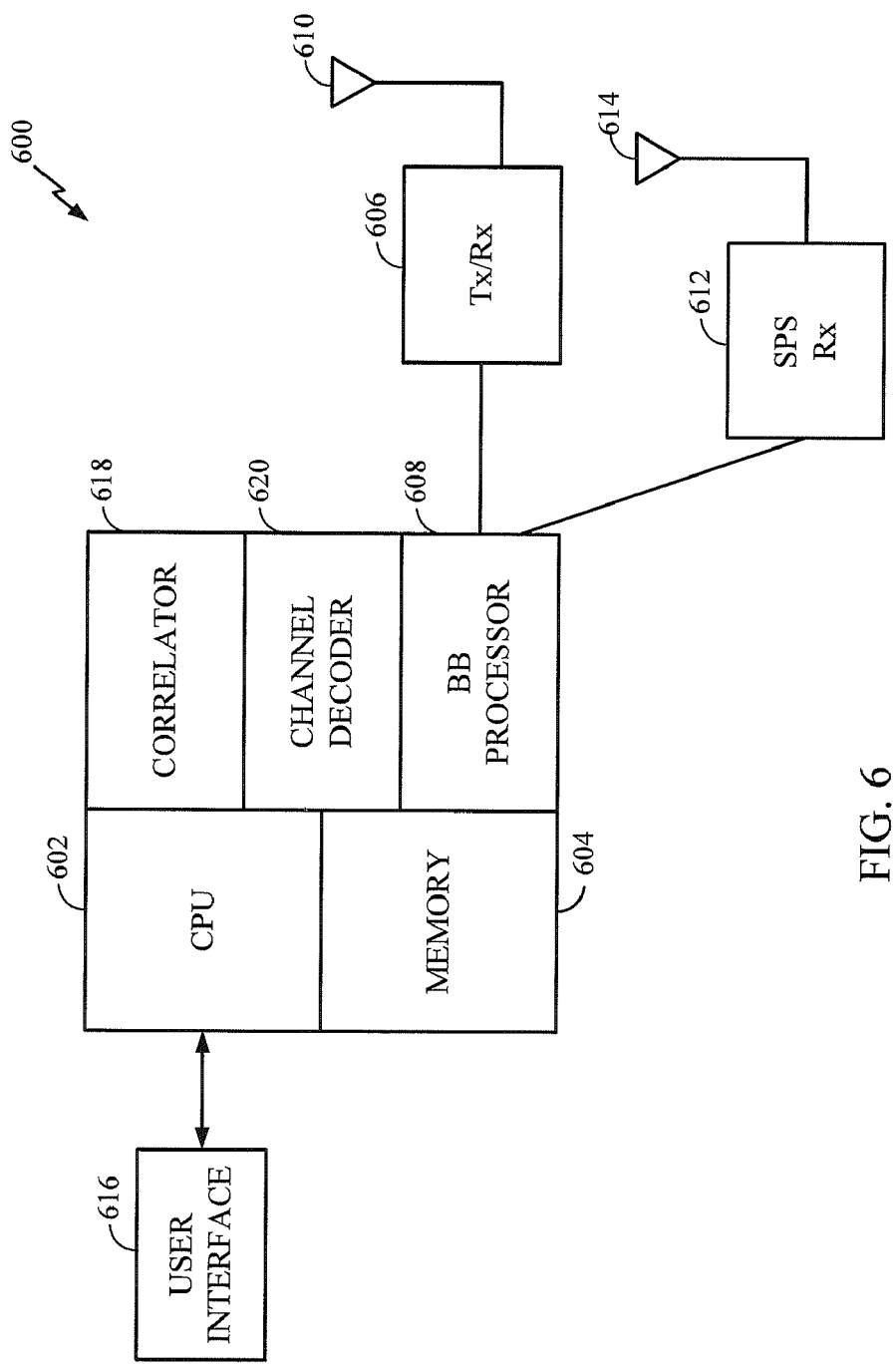
FIG. 6 is a schematic diagram of a SET according to a particular implementation.

FIG. 6 is a schematic diagram of a SET 600 according to a particular implementation. SET 600 may include a transceiver 606 to modulate an RF carrier signal with baseband information, such as voice or data, onto an RF carrier, and demodulate a modulated RF carrier to obtain such baseband information. An antenna 610 may transmit a modulated RF carrier over a wireless communications link and receive a modulated RF carrier over a wireless communications link.

Baseband processor 608 may provide baseband information from CPU 602 to transceiver 606 for transmission over a wireless communications link. Here, CPU 602 may obtain such baseband information from an input device within user interface 616. Baseband processor 608 may also be adapted to provide baseband information from transceiver 606 to CPU 602 for transmission through an output device within user interface 616.

SPS receiver (SPS Rx) 612 may receive and/or demodulate transmissions from transmitters through SPS antenna 614, and provide demodulated information to correlator 618. Correlator 618 may derive correlation functions from the information provided by receiver 612. For a given pseudo noise (PN) code, for example, correlator 618 may produce a correlation function defined over a range of code phases to set out a code phase search window, and over a range of Doppler frequency hypotheses as illustrated above. As such, an individual correlation may be performed in accordance with defined coherent and non-coherent integration parameters.

Correlator 618 may also derive pilot-related correlation functions from information relating to pilot signals provided by transceiver 606. This information may be used by a subscriber station to acquire wireless communications services.

Channel decoder 620 may decode channel symbols received from baseband processor 608 into underlying source bits. In one example where channel symbols comprise convolutionally encoded symbols, channel decoder 620 may comprise a Viterbi decoder. In a second example, where channel symbols comprise serial or parallel concatenations of convolutional codes, channel decoder 620 may comprise a turbo decoder.

Memory 604 may store machine-readable instructions executable to perform one or more of processes, examples, implementations, or examples thereof, which have been described or suggested. CPU 602 may access and/or execute such machine-readable instructions. Through execution of machine-readable instructions, CPU 602 may direct correlator 618 to analyze SPS correlation functions provided by correlator 618, derive measurements from the peaks thereof, and/or determine whether an estimate of a location is sufficiently accurate. However, these are merely examples of tasks that may be performed by a CPU in a particular aspect and claimed subject matter in not limited in these respects.

In a particular example, CPU 602 at a subscriber station may estimate a location the subscriber station based, at least in part, on signals received from SVs as illustrated above. CPU 602 may also be adapted to determine a code search range for acquiring a second received signal based, at least in part, on a code phase detected in first received signals as illustrated above according to particular examples.

Figure 7:
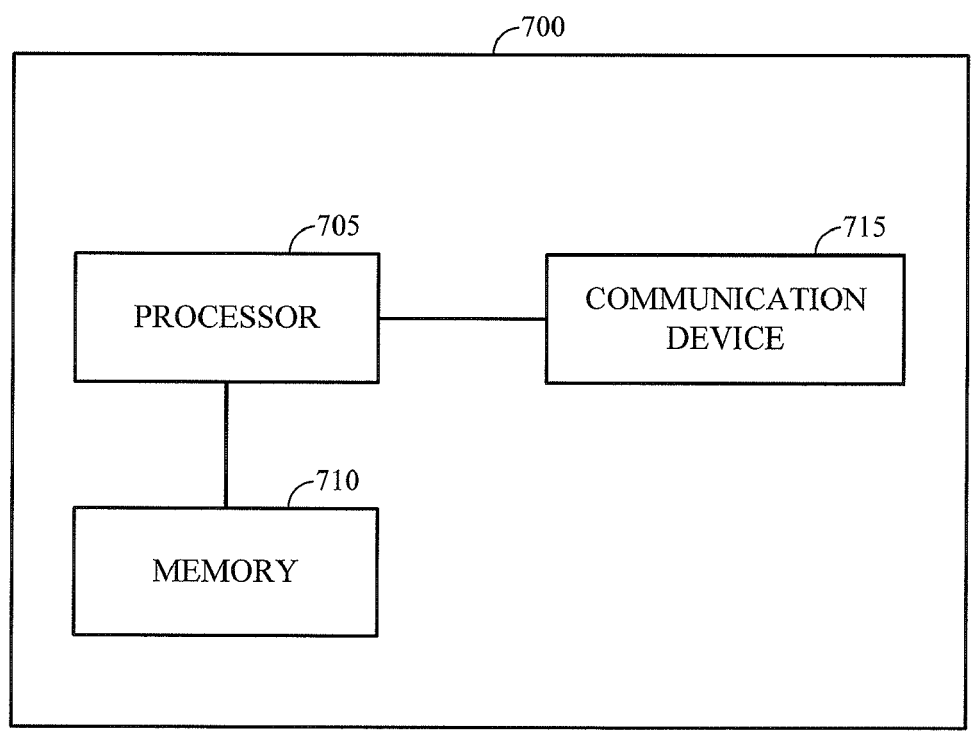
FIG. 7 is a schematic diagram of an H-SLP according to one particular implementation.

FIG. 7 is a schematic diagram of an H-SLP 700 according to one particular implementation. A D-SLP and/or an E-SLP may also be depicted by a schematic diagram similar to, or the same as, that shown in FIG. 7. As shown, H-SLP 700 may include a processor 705, a memory 710, and a communication device 715. The memory 710 may store instructions, such as program code, that may be executable by processor 705. Communication device 715 may include an antenna for communicating and/or receiving wireless transmissions. The communication device 715 may also include a modem or other device from receiving communications via a hard-wired connection to the H-SLP 700.

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data or information as expressed by a particular state of the storage media. For example, an electronic signal representative of data or information may be "stored" in a portion of the storage media (e.g., memory) by affecting or changing the state of such portions of the storage media to represent data or information as binary information (e.g., ones and zeros). As such, in a particular implementation, such a change of state of the portion of the storage media to store a signal representative of data or information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, includes compact disc (CD), laser disc, optical disc, digital versatile disc (DVD), floppy disk and blue-ray disc where disks usually reproduce data magnetically, while discs reproduce data optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rdGeneration Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In one particular implementation, a mobile device may, for example, be capable of communicating with one or more femtocells facilitating or supporting communications with the mobile device for the purpose of estimating its location, orientation, velocity, acceleration, or the like. As used herein, "femtocell" may refer to one or more smaller-size cellular base stations that may be enabled to connect to a service provider's network, for example, via broadband, such as, for example, a Digital Subscriber Line (DSL) or cable. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example. However, such details relating to femtocells are merely examples, and claimed subject matter is not so limited.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions or data may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing apparatus or device. In the context of this Specification, therefore, a special purpose computer or a similar special purpose electronic computing device or apparatus is capable of manipulating or transforming signals, typically represented as physical electronic, electrical, or magnetic quantities within memories, registers, or other information storage devices, transmission devices, or display devices of the special purpose computer or similar special purpose electronic computing device or apparatus.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

The invention claimed is:

1. A method, at a mobile station, for locating the mobile station comprising:
   receiving a location identifier from a location server;
   transmitting the location identifier to one or more trusted entities;
   receiving a request for a location estimate of the mobile station from the location server, the request comprising the location identifier received from the location server; and
   selectively authorizing the request for the location estimate at least partially in response to receiving the request comprising the location identifier.

2. The method of claim 1, further comprising selectively inhibiting the request for the location estimate at least partially in response to the request containing an incorrect location identifier that is different from the location identifier transmitted from the location server to the mobile station.

3. The method of claim 1, wherein the location identifier is provisioned at the location server.

4. The method of claim 1, wherein the location identifier comprises a location Universal Resource Identifier (URI).

5. The method of claim 1, wherein at least one of the one or more trusted entities comprises a Secure User Plane Location (SUPL) agent.

6. The method of claim 1, wherein the mobile station comprises a Secure User Plane Location (SUPL) Enabled Terminal (SET) and the location server comprises a SUPL Location Platform (SLP).

7. The method of claim 6, wherein the SLP comprises a Home SUPL Location Platform (H-SLP).

8. The method of claim 6, wherein the SLP comprises a Discovered SUPL Location Platform (D-SLP).

9. The method of claim 8, wherein at least one of the one or more trusted entities comprises a Home SUPL Location Platform (H-SLP).

10. The method of claim 1, wherein the trusted entity comprises a Public Safety Answering Point (PSAP).

11. The method of claim 1, further comprising transmitting a request from the mobile station to the location server to request the location identifier.

12. The method of claim 1, wherein the location identifier is received from the location server via a Secure User Plane Location (SUPL) session.

13. A mobile station, comprising:
    a transmitter to transmit messages to one or more trusted entities, the messages comprising a location identifier for the mobile station received from a location server;
    a receiver to receive messages from the location server comprising a request for a location estimate of the mobile station, wherein the request comprises the location identifier; and a processor to selectively authorize the request for the location estimate at least partially in response to receiving the request comprising the location identifier.

14. The mobile station of claim 13, the processor to further selectively inhibit the request for the location estimate at least partially in response to the request containing an incorrect location identifier that is different from the location identifier transmitted from the location server to the mobile station.

15. The mobile station of claim 13, wherein the location identifier is provisioned at the location server.

16. The mobile station of claim 13, wherein the location identifier comprises a location Universal Resource Identifier (URI).

17. The mobile station of claim 13, wherein at least one of the one or more trusted entities comprises a Secure User Plane Location (SUPL) agent.

18. The mobile station of claim 13, wherein the mobile station comprises a Secure User Plane Location (SUPL) Enabled Terminal (SET) and the location server comprises a SUPL Location Platform (SLP).

19. The mobile station of claim 18, wherein the SLP comprises a Home SUPL Location Platform (H-SLP).

20. The mobile station of claim 18, wherein the SLP comprises a Discovered SUPL Location Platform (D-SLP).

21. The mobile station of claim 20, wherein at least one of the one or more trusted entities comprises a Home SUPL Location Platform (H-SLP).

22. The mobile station of claim 13, wherein the trusted entity comprises a Public Safety Answering Point (PSAP).

23. The mobile station of claim 13, the transmitter to further transmit a request message to the location server comprising a request for the location identifier.

24. The mobile station of claim 13, wherein the location identifier is received by the transmitter via the messages received from the location server via a Secure User Plane Location (SUPL) session.

25. A mobile station, comprising:
    means for receiving a location identifier from a location server;
    means for transmitting the location identifier to one or more trusted entities;
    means for receiving a request for a location estimate of the mobile station from the location server, the request comprising the location identifier received from the location server; and
    means for selectively authorizing the request for the location estimate at least partially in response to receiving the request comprising the location identifier.

26. The mobile station of claim 25, further comprising means for selectively inhibiting the request for the location estimate at least partially in response to the request containing an incorrect location identifier that is different from the location identifier transmitted from the location server to the mobile station.

27. The mobile station of claim 25, wherein the location identifier comprises a location Universal Resource Identifier (URI).

28. The mobile station of claim 25, wherein the mobile station comprises a Secure User Plane Location (SUPL)

Enabled Terminal (SET) and the location server comprises a SUPL Location Platform (SLP).

29. The mobile station of claim 25, wherein the means for transmitting is further capable of transmitting a request from the mobile station to the location server to request the location identifier.

30. The mobile station of claim 25, wherein the means for receiving is capable of receiving the location identifier from the location server via a Secure User Plane Location (SUPL) session.

31. An article comprising:
a non-transitory storage medium having machine-readable instructions stored thereon which are executable by a special purpose computing apparatus to:
process a location identifier received by a mobile device from a location server;
initiate transmission of the location identifier from the mobile device to one or more trusted entities;
process a received request for a location estimate of the mobile station from the location server, the request comprising the location identifier received from the location server; and
selectively authorize the request for the location estimate at least partially in response to the mobile device receiving the request comprising the location identifier.

32. The article of claim 31, wherein the instructions are further executable by the special purpose computing apparatus to selectively inhibit the request for the location estimate at least partially in response to the request containing an incorrect location identifier that is different from the location identifier transmitted from the location server to the mobile station.

33. The article of claim 31, wherein the location identifier is provisioned at the location server.

34. The article of claim 31, wherein the location identifier comprises a location Universal Resource Identifier (URI).

35. The article of claim 31, wherein at least one of the one or more trusted entities comprises a Secure User Plane Location (SUPL) agent.

36. The article of claim 31, wherein the mobile station comprises a Secure User Plane Location (SUPL) Enabled Terminal (SET) and the location server comprises a SUPL Location Platform (SLP).

37. The article of claim 36, wherein the SLP comprises a Home SUPL Location Platform (H-SLP).

38. The article of claim 36, wherein the SLP comprises a Discovered SUPL Location Platform (D-SLP).

39. The article of claim 38, wherein at least one of the one or more trusted entities comprises a Home SUPL Location Platform (H-SLP).

40. The article of claim 31, wherein the trusted entity comprises a Public Safety Answering Point (PSAP).

41. The article of claim 31, wherein the instructions are further executable by the special purpose computing apparatus to initiate transmission of a request from the mobile station to the location server to request the location identifier.

42. The article of claim 31, wherein the location identifier is capable of being received from the location server via a Secure User Plane Location (SUPL) session,
transmitting the location identifier to one or more trusted entities;
receiving a request for a location estimate of the mobile station from the location server, the request comprising the location identifier received from the location server; and
selectively authorizing the request for the location estimate based at least in part on the location identifier.

* * * * *